No. 753,430. PATENTED MAR. 1, 1904.
C. PROUTY.
CHUCKING MACHINERY.
APPLICATION FILED OCT. 4, 1898.
NO MODEL. 6 SHEETS—SHEET 1.
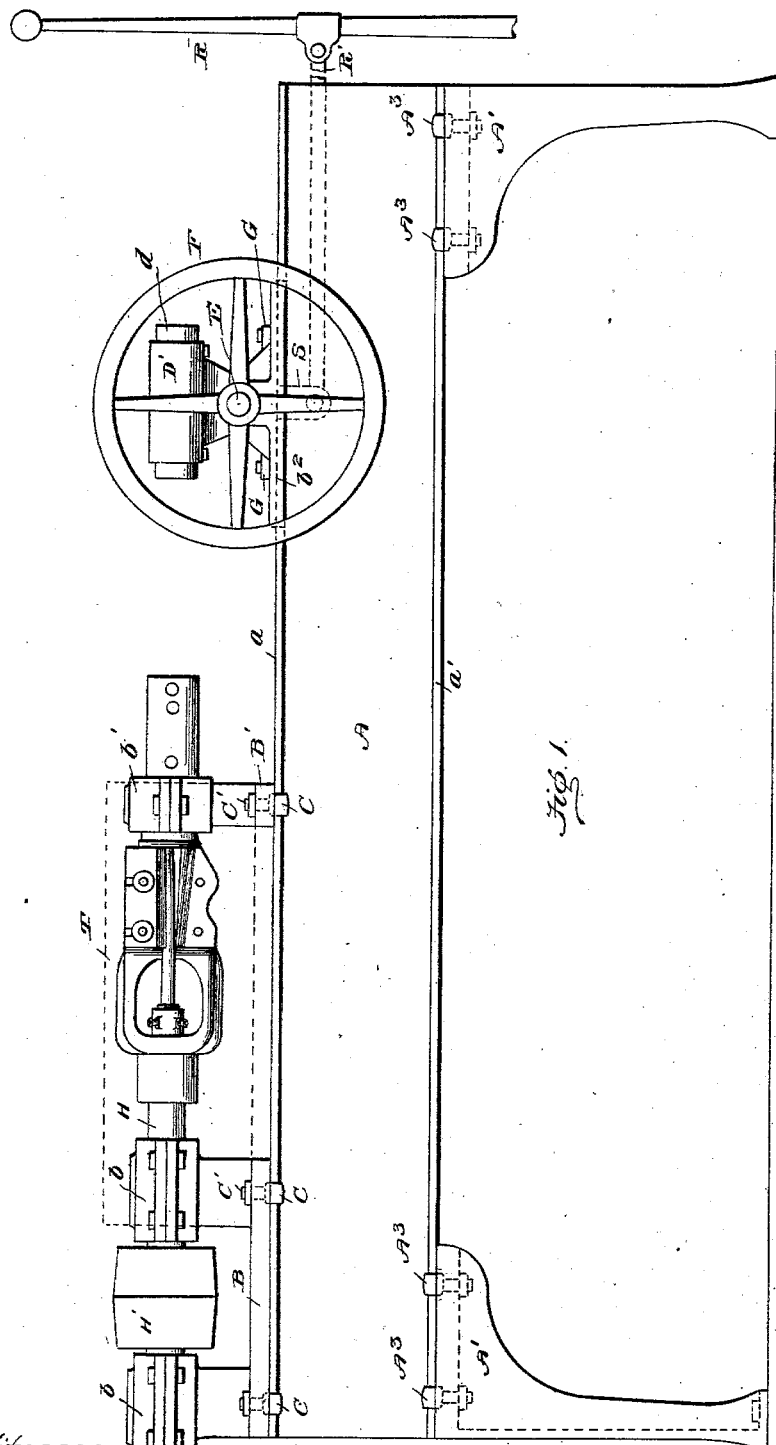

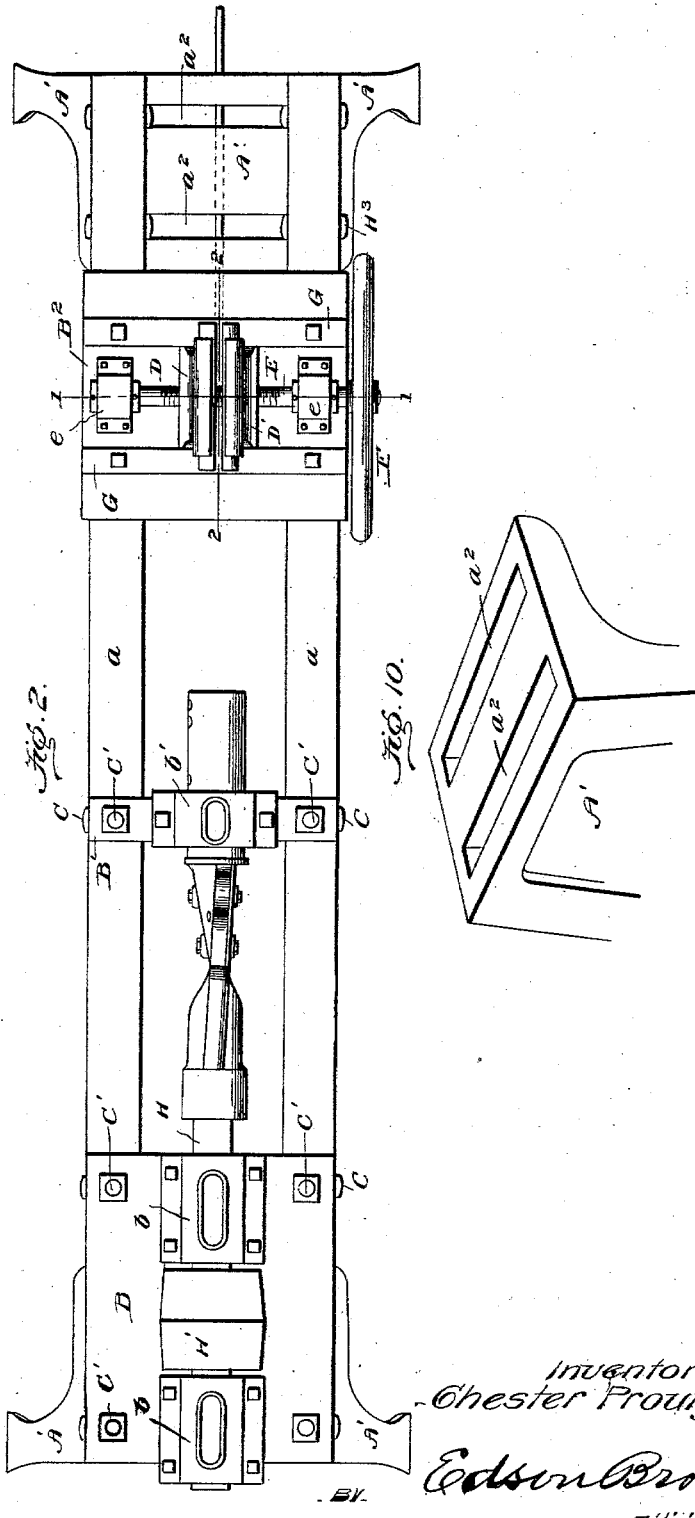

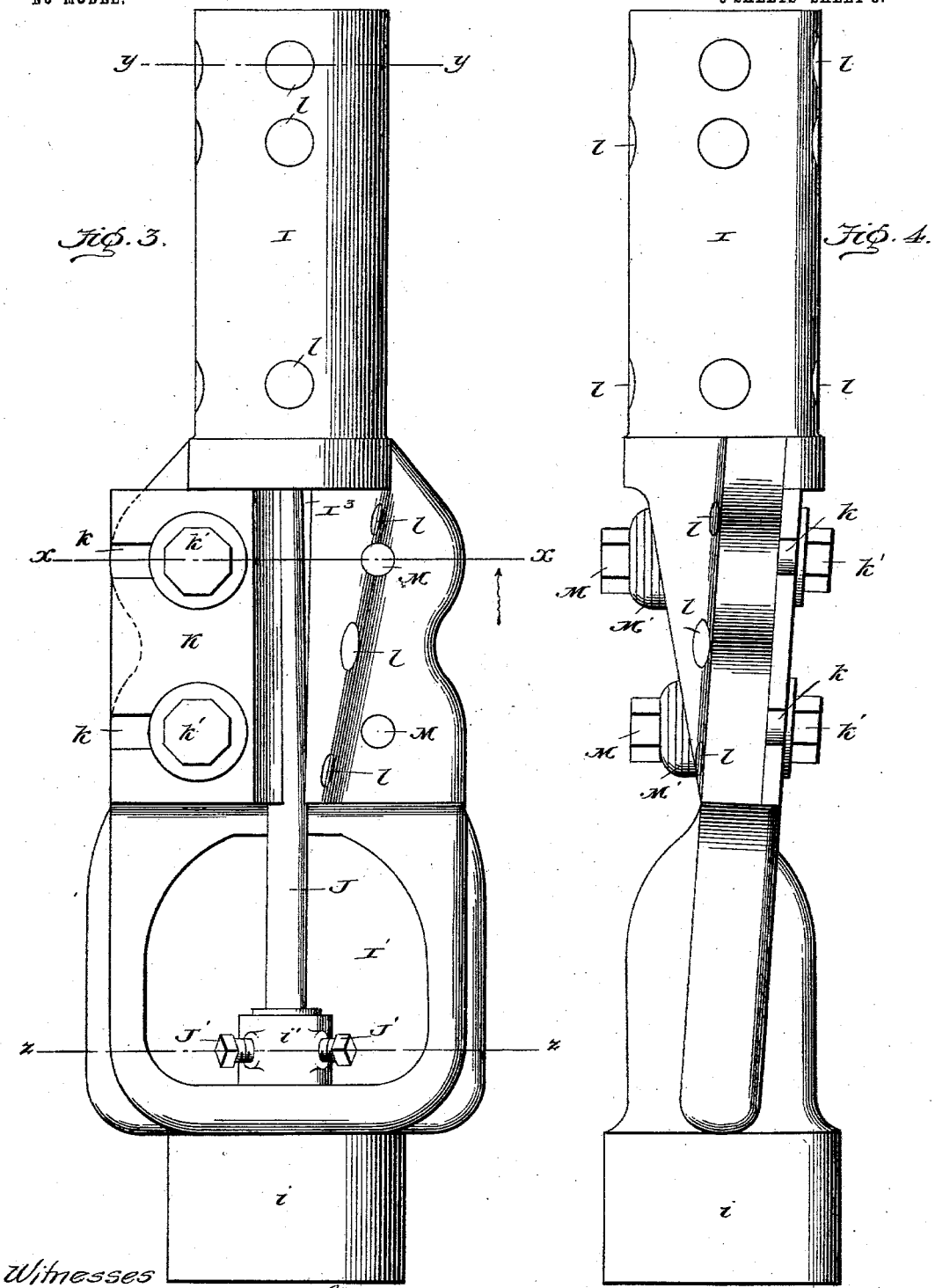

No. 753,430. PATENTED MAR. 1, 1904.
C. PROUTY.
CHUCKING MACHINERY.
APPLICATION FILED OCT. 4, 1898.
NO MODEL. 6 SHEETS—SHEET 4.
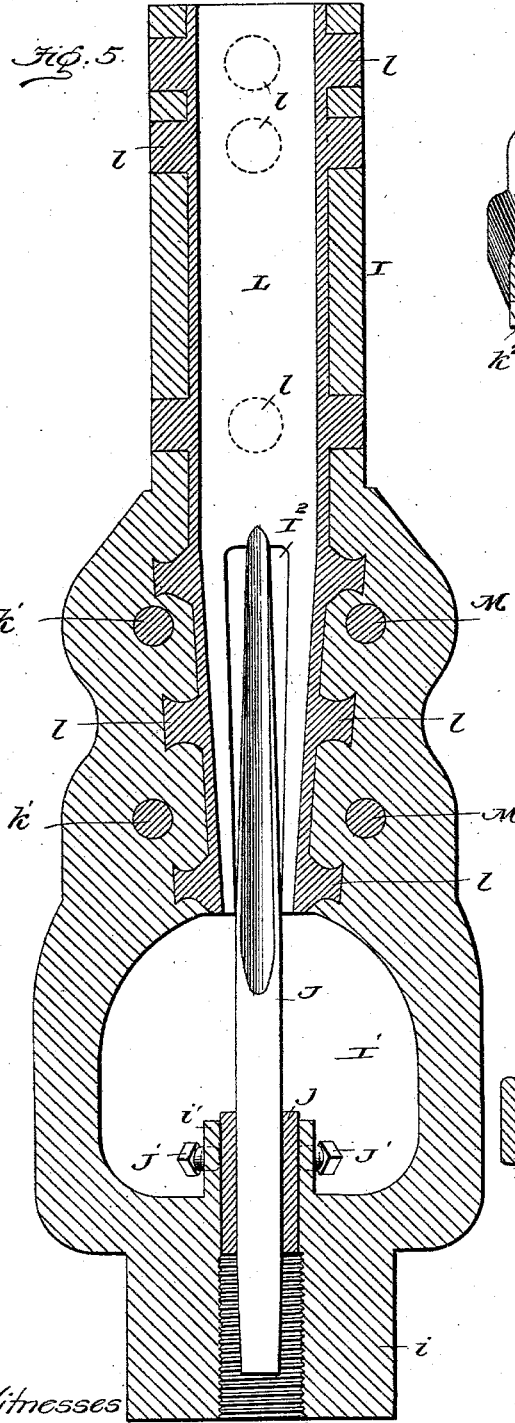
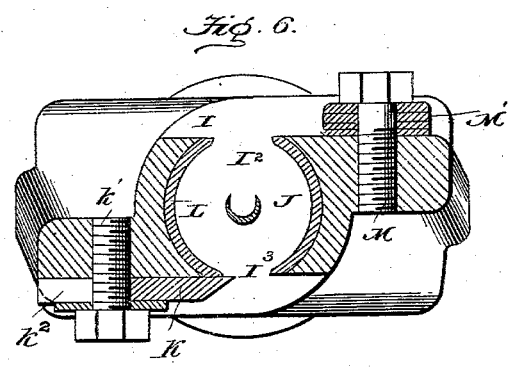
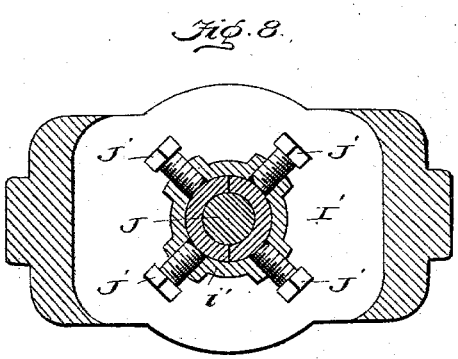
Inventor:
Chester Prouty,
BY Edson Bro's,
Att'ys.
Witnesses No. 753,430. PATENTED MAR. 1, 1904.
C. PROUTY.
CHUCKING MACHINERY.
APPLICATION FILED OCT. 4, 1898.
NO MODEL. 6 SHEETS—SHEET 5.
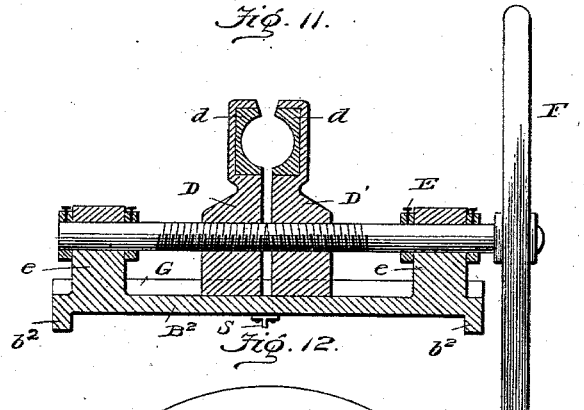
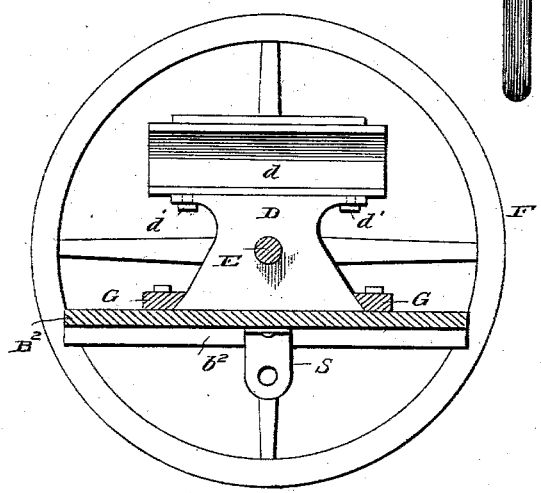
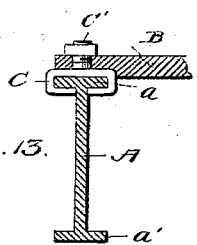
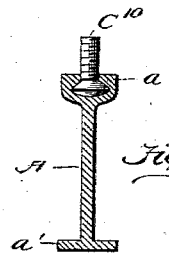
Witnesses: Inventor:
Chester Prouty,
By Edson Bro's
Att'ys.

No. 753,430. PATENTED MAR. 1, 1904.
C. PROUTY.
CHUCKING MACHINERY.
APPLICATION FILED OCT. 4, 1898.
NO MODEL. 6 SHEETS—SHEET 6.

Witnesses:

Inventor:
Chester Prouty.
By Edson Bros,
Attys.

No. 753,430. Patented March 1, 1904.

UNITED STATES PATENT OFFICE.

CHESTER PROUTY, OF RIDGWAY, PENNSYLVANIA.

CHUCKING MACHINERY.

SPECIFICATION forming part of Letters Patent No. 753,430, dated March 1, 1904.

Application filed October 4, 1898. Serial No. 692,641. (No model.)

*To all whom it may concern:*

Be it known that I, CHESTER PROUTY, a citizen of the United States, residing at Ridgway, in the county of Elk and State of Pennsylvania, have invented certain new and useful Improvements in Chucking Machinery; and I do hereby declare the following to be a full, clear, and exact description of the invention, such as will enable others skilled in the art to which it appertains to make and use the same.

My present invention relates to improvements in machines for use in the manufacture of wooden handles for tools.

The particular embodiment of the invention which is herein illustrated is especially designed for and adapted to be used in forming that end of the handle of a cant-hook or peavey which is fitted into the metal socket of such an implement.

The object of the invention is to provide a machine by which the exterior of the handle can be quickly reduced to such size and form as to fit snugly within such a socket and simultaneously to form a tapering socket into which the inner end of the longitudinally-extending spur of a peavey may extend and be secured.

Another object is to provide means whereby the operative face or surface of the former or chuck may be maintained smooth and cheaply and expeditiously repaired when worn.

Figure 19:
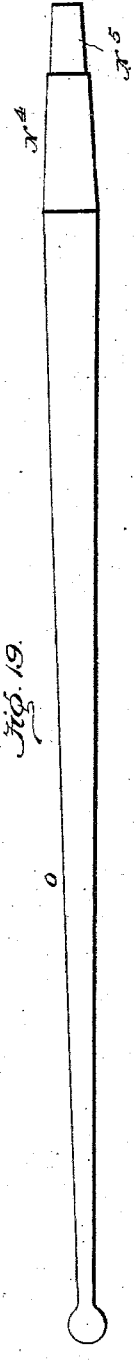

In the drawings, Figure 1 is a side elevation of an embodiment of my invention. Fig. 2 is a plan view. Fig. 3 is an elevation of the former or chuck detached from the machine and placed in a vertical position. Fig. 4 is an elevation of the same viewed from a point at right angles to that from which Fig. 3 is taken. Fig. 5 is a longitudinal sectional view of said former. Figs. 6, 7, and 8 are sectional views taken on the lines $x\,x$, $y\,y$, and $z\,z$, respectively, of Fig. 3. Fig. 9 is a detail view of one form of device for connecting the supports for the power devices to the bed or body of the machine. Fig. 10 is a detail view of one of the legs or supports for the machine. Fig. 11 is a sectional view of the work-holder or clamp device, taken on the line 1 1 of Fig. 2. Fig. 12 is a sectional view of the same device, taken on the line 2 2 of Fig. 2. Figs. 13 and 14 are detail views of means for connecting parts of the framework together. Figs. 15 to 18 illustrate a peavey-handle at various stages in the course of its manufacture. Fig. 19 is a view of a slightly different form of handle.

Referring to the drawings, in which like letters of reference designate corresponding parts in the several figures, and more particularly to Figs. 1 and 2, it will be seen that the machine is mounted upon a bed consisting of longitudinally-extending side pieces, which at the ends are secured to and supported by legs A'. The side pieces A of this frame are preferably formed of I-bars, having horizontal flanges $a\,a'$ at their upper and lower edges, respectively. Slots $a^2$ are formed in the legs A', and through these extend the stems of bolts $A^3$, which are provided at their upper ends with means for engaging the aforesaid flange $a'$ on the side bars A, and by means of said bolts $A^3$ the bars A and legs A' are securely and rigidly but detachably connected. The side bars A are connected at intermediate points of their length by cross plates or bars, as at B B' $B^2$. Two of these plates—namely, those at B B'—are rigidly connected to the side bars A by means of connecting devices having grooved bodies C, adapted to receive and grip the upper flanges $a$ of the side bars, and upwardly-extending threaded stems C', adapted to pass through apertures in the plates B B'. By means of nuts screwed on said threaded stems C' the plates B B' can be held rigidly in any adjusted position on the bed. On said plates B B' are mounted the bearings for the power-shaft and rotary chuck or former of the machine, while on the other of aforesaid plates, that at $B^2$, is mounted the clamp mechanism or holder, by which the blank to be operated on is supported and adjusted relative to the chuck. This last said plate is not rigidly secured to the bed or frame of the machine, but is arranged to move longitudinally thereof. It is provided at its sides with depending flanges $b^2$, which are adapted to extend down the outer vertical sides of the flanges $a$, so that said flanges form guides along which the plate $B^2$ and parts carried thereby can be moved. The clamping device consists of two jaws D D', which are mounted upon said plate B² in such manner that they can be adjusted toward and from each other laterally of the machine to grip or release a blank placed between them. In the embodiment of my invention herein illustrated these jaws are secured to the plate B² by means of two parallel transversely-extending strips G. These strips, as shown in Fig. 12, are made in such form that the edges adjacent to the jaws D D' project somewhat over the bases of said jaws, and thus effectually prevent said jaws from moving or being displaced in a direction longitudinal of the machine without interfering with the above-described lateral adjustment. This last-mentioned adjustment is preferably effected by means of a shaft E, having two oppositely-threaded sections, which engage one with the jaw D and the other with the jaw D' of the clamp. This shaft E is mounted in suitable bearings formed in uprights e on the plate B² and is provided at one end with a hand-wheel F by which said shaft may be turned and, according to the direction of rotation, the jaws D D' caused to approach each other or separate.

One of the features of my invention is the employment of a clamp which will hold a blank without marring the surface thereof and the working parts of which can be readily replaced when worn.

By reference to Figs. 11 and 12 it will be seen that the portions of the clamping-jaws which directly engage with the blank are made separately from and detachably secured to the body of the jaws—that is, I provide each clamping-jaw with a detachable face-block d and employ set-screws d' to hold such block in the seat or recess provided therefor—and preferably I make these blocks d of wood. By this construction I am able to obtain a firm grip upon a wooden blank without danger of marring its surface. Again, the face of such a clamping-block can be cheaply and easily shaped so as to conform to the blank to be grasped, and when one has become worn it can be quickly removed and another substituted. Still another advantage possessed by such a construction is the ease with which the clamp can be adapted for use with blanks of different forms. With a solid metal clamp the entire device would have to be removed from the machine and a new one substituted in case it was desired to work a blank differing in form from that which the clamp was designed; but in my machine it is simply necessary to remove the relatively small blocks d d and substitute others having the desired face contour.

H designates a horizontally-arranged shaft which is mounted in bearings b, supported on the aforesaid plate B, and on said shaft is mounted a large pulley H'. This fast pulley H' will be connected by a belt (not shown) with any suitable engine or motor mechanism. On the inner end of this shaft H and in alinement therewith is secured the long counterbalanced chuck or former which I have devised. It would be impossible to operate long and large chucks such are necessary for shaping peavey and cant-hook handles and larger articles without providing a bearing near each end thereof, owing to the vibration resulting from the heft of the chuck upon its shaft and the play thereof in the bearings, which vibration would throw the work-receiving end of said chuck more or less out of alinement, and thereby prevent the accurate feeding of the handle thereto and upon the knife and bit therein. I have therefore formed the chuck with a cylindrical end portion I, which is in alinement with the shaft H and fits and revolves within a working bearing b' on the plate or cross-bar B', and at its opposite end with a collar or hub-like part i, into which the inner end of the shaft H is secured, preferably by means of a screw-thread. It is obvious that this bearing b', holds the chuck steady and in perfect running alinement with the shaft and the work-holder.

In the body of the chuck is formed a chamber I', which opens through opposite sides and communicates with one end of a tubular passage formed in the chuck and opening also through the free end of the portion I thereof. This passage, which is preferably of the form shown in Fig. 5, has two diametrically opposite longitudinally-extending slots I² I³ formed therein adjacent to the end of such passage which opens into the chamber I'.

The cutting-blade K is arranged to project slightly across the slot I³, said blade being rigidly secured to the body of the chuck by means of bolts k', which extend through slots k', formed in the body of the blade and by means of which said blade can be adjusted to cause its cutting edge to project the desired distance across the slot I³.

By reference to Fig. 6 it will be seen that the portion of the chuck-body against which the blade K rests is of such form as to furnish a solid abutment for said blade from side to side.

It is very essential in the manufacture of handles for cant-hooks and peaveys, for which purpose the present mechanism is particularly adapted, that the exterior or surface of the handle should be smoothed while being given the desired form. It is also essential that the product of a machine should be uniform.

I have devised a chuck the inner surface of which may be readily dressed and finished, so that it will be perfectly smooth and will not while rapidly revolving mar the surface of the wooden blank. I also so construct the chuck that the same can be repaired when worn, so that the diameter of its passage can be maintained the same, thereby permitting all blanks to be reduced to a uniform size.

To secure the above results, I employ a metal lining which can be secured within a chuck and which when worn can be removed and replaced by another which will have exactly the interior form desired. Such a lining is indicated at L in the drawings, it being formed of Babbitt metal, magnolia metal, or any suitable similar material. As shown, it is held in place by means of integral radially-projecting tongues l, that extend through passages extending outwardly from the longitudinal passage in the chuck. The manner of forming this lining is as follows: A pattern-handle, which has been previously made of exactly the dimensions and form to which it is desired to reduce the blanks to be operated on, is inserted in the passage in the chuck and accurately centered therein in relation to the knife or cutter K. The outer ends of the radial passages in the chuck are then closed, and a suitable quantity of the lining metal in a molten state is poured into the passage. This forms a coating about the pattern and fills all depressions in the inner surface of the chuck. When the metal has become cool, the pattern is removed and the passage is left with a smooth soft-metal lining. When this becomes worn, it is only necessary to cut out or drive in the spurs or retaining projections l, and the lining can then be withdrawn from the chuck-body. A new lining can then be easily applied in the manner above described. A lining formed in this manner materially reduces the friction between the blank and walls of the chuck that is experienced when the latter are entirely composed of iron or steel and besides acting as a lubricant to the blank effectually prevents marring the surface thereof.

My present machine is not only adapted for forming handles, as by using the knife or cutting-blade K, but is also adapted to simultaneously form in the end of the handle adjacent to said knife a tapering socket for the reception of the shank of the longitudinal spur or point of a peavey. To accomplish this last result, I employ a bit J, which is rigidly connected to and revolves with the above-described chuck.

Referring particularly to Figs. 3, 5, and 8 of the drawings, it will be seen that the stem of the bit J extends through a sleeve $j''$, which is fitted within a boss $i''$, projecting from the body of the chuck into the space I in line with the longitudinal passage in said chuck. By means of adjusting-screws $J'$ the bit can be accurately centered and its cutting portion, which extends into the passage in the chuck adjacent to the knife or cutter K, properly positioned to bore the desired socket in the handle to be produced.

It will be seen that in order to accomplish the objects for which my improvements are especially designed—i. e., to produce a handle having a shell end—it is necessary that the blank be accurately supported relative to the knife and bit and maintained in proper position while being moved longitudinally into or from the chuck in order to prevent the tearing or cutting of the end of the handle by the bit or knife. Therefore I have provided the chuck with the cylindrical guide portion I, before referred to, which guide is greater in length than that portion of the handle to be chucked, and the inner surface thereof is formed of material which will not mar the surface of the blank passed therethrough and will create but the minimum amount of friction during both the logitudinal movement of the handle and the rotary motion of the chuck thereon. It will thus be seen that at all times during the turning of said handle the cylindrical portion thereof, which, as before stated, is longer than the part to be chucked, will bear in the long cylindrical guide of the chuck, and thereby insure a true movement of said handle to and from the knife and bit.

It is obvious that the higher the rate of speed which may be attained by the chuck the finer and better the work of the knife and bit will be.

While a chuck having a hard-metal bearing for the chucked end of the handle can have but a limited number of revolutions within a stated period, I have found that by providing a bearing of soft metal—such as magnolia, babbitt, or a composition of magnolia metal and lead or such metals as will form a practically frictionless bearing upon wood—a speed at least one-half or two-thirds greater than that attained by chucks having hard-metal bearings can be attained. Again, it is absolutely necessary that all of the chips and dust produced by the cutter and bit should be withdrawn from the chuck, as the presence of such material would act to wedge the blank against either the blade or bit and cause one or the other of such tools to cut and split the blank undesirably.

By my construction the chamber $I'$ and slots $I^2$ $I^3$ form a draft passage or outlet through which the high revolution of the chuck creates a strong current of air, which effectually withdraws all of the dust and chips from the chuck and delivers them through one of the openings of the chamber $I'$.

I am of course aware that prior to my invention it has been proposed to provide journal-boxes of carriages and wagons with soft-metal linings; but it will be seen that my improvements are different from and subjected to different wear from the linings of journal-boxes.

As before stated, it is necessary in the use of such a wood-turning machine as that herein presented that the wooden blank be fed longitudinally while being operated on by the cutting devices, and it is also necessary that while being thus moved longitudinally the blank be held from any other movement or vibration.

To the body of the chuck, on the opposite side thereof from the knife or cutter K, I secure a counterbalance in order that there may be no undue jarring or vibration of the machine when running at a high speed. At this time I preferably employ for this purpose a series of disk or washer like weights M', which are secured to the body of the chuck by means of bolts M. When the machine is first built, a sufficient number of these weights is provided to counterbalance the weight of the blade K, and as the latter becomes worn the number of such weights will be reduced to maintain the desired balancing.

If desired, a sheet-metal covering, such as is indicated at T in Fig. 1, may be placed over the chuck or former to prevent the shavings produced by the knife from falling beyond the sides of the bed.

Figure 15:
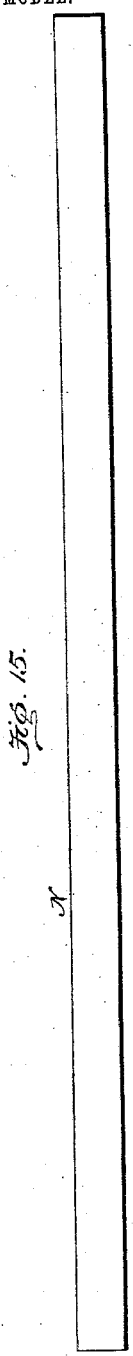

The manner of using my improvements and the results accomplished may be briefly stated as follows: A blank N, such as is illustrated in Fig. 15, is first by any suitable machine turned into the form shown in Fig. 16, in which is shown a handle having a relatively long tapering section O and a relatively short cylindrical section N' greater in length than that portion to be chucked. To reduce this section N' to such form and size as to adapt it to be readily inserted in the socket of a cant-hook or peavey is the particular purpose of my machine. If a socket P of uniform diameter from end to end (see Fig. 17) is first bored in section N' and the exterior of said section thereafter reduced to desired form, it is necessary to resort to a separate operation to ream the outer end of the socket P to enlarge it to the desired diameter. This operation frequently results in splitting the thin wood surrounding said socket, thus weakening the handle.

Figure 16:
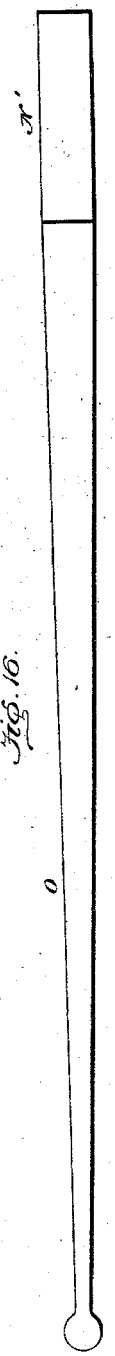
Figure 17:
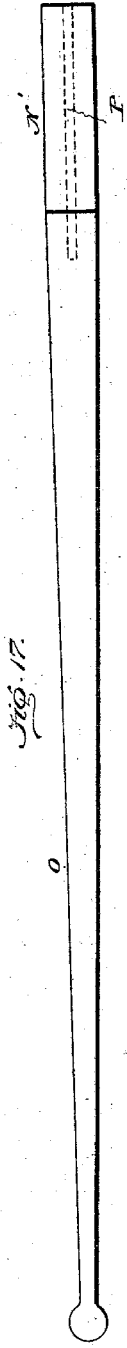
Figure 18:
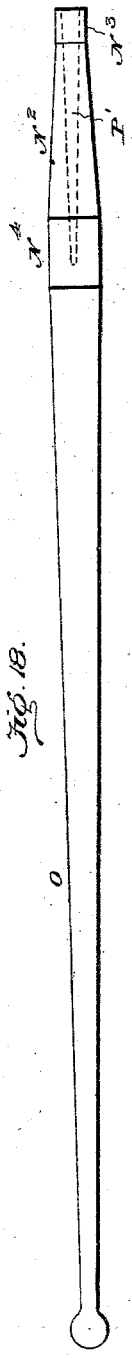

In using my present machine I take a blank of the form of that shown in Fig. 16 and clamp the section O thereof between the jaws D D', the section N' extending toward the former or chuck I. Preferably I make the section N' somewhat longer than that indicated in Fig. 16, so that when the handle is finished there will be a short cylindrical section N⁴ between the two oppositely-tapering sections O N².

From the description hereinbefore given and the drawings it will be seen that the plate B² may be considered as a carriage mounted on and adapted to move longitudinally of the bed. To effect this longitudinal movement of said plate and the jaws D D', use may be made of a lever R. This lever, which is suitably fulcrumed at its lower end, is connected to a lug or stud S, depending from the plate B², by means of a rod or link R'. As the operator moves the upper end of the lever R toward the chuck I the jaws D D' of the work-holder will be correspondingly moved and the section N' will be forced into the chuck, and as this movement continues such section will be acted on by the knife K and reduced to the tapering form N², and when the lever R has reached the end of its forward movement the free end of said section N' will project beyond the knife K and be of the form indicated at N³. While the cutter K is as described, thus giving the desired shape to the socket end of the handle, the bit J will have formed in that end a tapering socket, as at P' in Fig. 18.

It will be understood that in many respects there can be modification in the parts above described without departing from my invention.

In Fig. 14 I have illustrated a slightly-modified form of device for connecting the side bars and top plate of the bed-frame. In this construction a groove is formed in the top flange $a$ of the side plate, and in this groove is fitted the head of the securing-bolt $C^{10}$.

I am aware that prior to my invention it has been proposed to provide the jaws of clamp-vises with removable non-metallic face-plates or blocks; but I believe myself to be the first to have provided the work-holder of a wood-working-machine with jaws of the character of those herein, and, as I have hereinbefore pointed out, the construction and arrangement of parts of the work-holder presented in this application are of great practical advantage in the manufacture of such articles as it is the special purpose of my improved chucking machinery to produce. By providing the jaws of the holder with non-metallic blocks the desired grip can be obtained upon the blank to be operated on by the knife without marring the surface thereof, and this advantage is increased and maintained by shaping the exposed faces of the blocks to conform to the blank to be supported and by making them removable, whereby they can be readily replaced when worn or the holder quickly changed to properly support blanks of different cross-sectional form.

Having thus fully described my invention, what I claim as new, and desire to secure by Letters Patent, is—

1. The herein-described chuck for the purpose specified consisting of a body provided with a longitudinally-extending passage one end of which communicates with a chamber that opens through opposite walls of the chuck, two longitudinally-extending slots being formed at diametrically opposite points in the walls of said chuck-passage, a knife or cutter secured to the chuck and extending partially across one of said slots, and a bit mounted in the chuck and extending across the aforesaid chamber therein and into the adjacent end of the chuck-passage, substantially as set forth.

2. The herein-described chuck for a wood-turning machine comprising a revoluble body having a longitudinally-extending tapering passage therein and an open chamber beyond and communicating with the said tapering passage, a knife or cutter arranged to act upon a blank forced longitudinally through said passage, a boss to the chuck extending into the open chamber and in alinement with the passage, a bit secured in the boss and extending into the passage, and a soft-metal lining adapted to bear against the blank in advance of the knife and in the tapering portion of the passage adjacent to the knife, for the purpose set forth.

3. In a machine for the purpose described, the combination of a bed or base, a chuck mounted on said frame and having a longitudinal passage formed therein and communicating at one end with a chamber, I', that opens through opposite sides of the chuck, a knife or cutter mounted on the chuck in advance of the chamber, I', and extending into the passage in the chuck, a tubular guide forming a continuation of the longitudinal passage of the chuck in advance of the knife or cutting-blade, and provided with a lining of soft metal, a work-holder mounted on the bed in advance of the chuck-guide, and means for moving the said holder longitudinally of the bed to force a blank engaged thereby through the chuck-guide into position to be operated on by the knife, substantially as set forth.

4. In a wood-turning machine a chuck having a longitudinally-extending passage therein provided with laterally-extending recesses, a cutter secured to the chuck and projecting into the passage therein, a soft-metal lining to said passage adapted to bear against a blank in advance of the cutter, and arms to the lining anchored in the recesses.

5. In a wood-turning machine a chuck consisting of a body provided with a longitudinally-extending passage one end of which communicates with a chamber that opens through opposite walls of the chuck, a soft-metal lining in the passage, laterally-extending arms thereto anchored in recesses in the wall of the passage, a cutter secured to the chuck and extending partially across a longitudinally-extending slot formed in the wall of the passage and its lining, and a bit mounted in the chuck and extending across the chamber and into the passage.

6. In a wood-turning machine a chuck having a longitudinally-extending passage therein and recesses in the wall of said passage, a soft-metal lining in the passage, and arms extending from the lining and anchored in the recesses, the sides of the arms being concaved longitudinally.

7. The herein-described chuck for the purpose specified consisting of a body provided with a longitudinally-extending passage one end of which communicates with a chamber that opens through opposite walls of the chuck, a cutter-blade extending partly across a slot in the wall of the passage, a boss extending from the body of the chuck at one end thereof, and a bit secured in said boss and extending across the chamber and into the passage.

In testimony whereof I affix my signature in presence of two witnesses.

CHESTER PROUTY.

Witnesses:
ANNA E. ENT,
M. M. LOGAN.